US012563007B2

(12) United States Patent (10) Patent No.: US 12,563,007 B2

Boyd et al. (45) Date of Patent: Feb. 24, 2026

(54) SUGGESTING RELEVANT GROUPS AND INDIVIDUALS IN MESSAGE REPLIES

(71) Applicant: Snap Inc., Santa Monica, CA (US)

(72) Inventors: Nathan Kenneth Boyd, Los Angeles, CA (US); Michael James Connolly, Mill Valley, CA (US); Daniel Vincent Grippi, New York, NY (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 140 days.

(21) Appl. No.: 18/468,276

(22) Filed: Sep. 15, 2023

(65) Prior Publication Data

US 2025/0097184 A1    Mar. 20, 2025

(51) Int. Cl.
| | |
|---|---|
| *G06F 3/048* | (2013.01) |
| *G06F 3/0482* | (2013.01) |
| *H04L 51/043* | (2022.01) |
| *H04L 51/216* | (2022.01) |
| *H04L 51/52* | (2022.01) |

(52) U.S. Cl.
CPC .......... *H04L 51/216* (2022.05); *G06F 3/0482* (2013.01); *H04L 51/043* (2013.01); *H04L 51/52* (2022.05)

(58) Field of Classification Search
CPC ..... H04L 51/216; H04L 51/043; H04L 51/52; G06F 3/0482; G06Q 10/107
See application file for complete search history.

(56) References Cited

U.S. PATENT DOCUMENTS

| | | | | |
|---|---|---|---|---|
| 10,819,532 | B1 * | 10/2020 | van Rensburg | ......... H04L 51/52 |
| 10,834,043 | B1 * | 11/2020 | Paul | ......................... H04L 51/52 |
| 11,190,366 | B2 * | 11/2021 | Rubinstein | .............. H04L 12/18 |
| 2007/0294428 | A1 | 12/2007 | Guy et al. | |
| 2013/0227030 | A1 * | 8/2013 | Eidelson | ................. H04L 51/23 |
| | | | | 709/206 |
| 2018/0295092 | A1 * | 10/2018 | Peiris | ..................... G06Q 50/01 |

(Continued)

OTHER PUBLICATIONS

"International Application Serial No. PCT US2024 046338, International Search Report mailed Dec. 4, 2024", 3 pgs.

(Continued)

*Primary Examiner* — Thanh T Vu
(74) *Attorney, Agent, or Firm* — Schwegman Lundberg & Woessner, P.A.

(57) ABSTRACT
A system and method for suggesting relevant groups and recipients when replying to messages in a messaging application. In response to a first received message, the system identifies groups with membership comprising the sender and receiver. Interface elements representing these mutual groups are displayed as selectable suggestions. The receiving user can choose groups to include in the reply, along with other users. Suggested groups are determined based on recent interactions, mutual connections, and message content. Users can also create new groups from suggestions for ongoing messaging. By recommending shared groups and relevant recipients, the system enables efficient context-based selection when replying. The suggestions aim to streamline recipient picking through intuitive interfaces and machine learning algorithms. This improves the user experience for seamless messaging discussions with appropriate recipients.

20 Claims, 8 Drawing Sheets

(56)               References Cited

U.S. PATENT DOCUMENTS

2019/0057143 A1 *   2/2019   Porter  ................... G06F 16/285
2021/0409354 A1 *  12/2021  Jang  ........................ H04L 51/18
2022/0224659 A1 *   7/2022   El Ghazzal  ........... H04L 51/216

OTHER PUBLICATIONS

"International Application Serial No. PCT US2024 046338, Written Opinion mailed Dec. 4, 2024", 6 pgs.

* cited by examiner

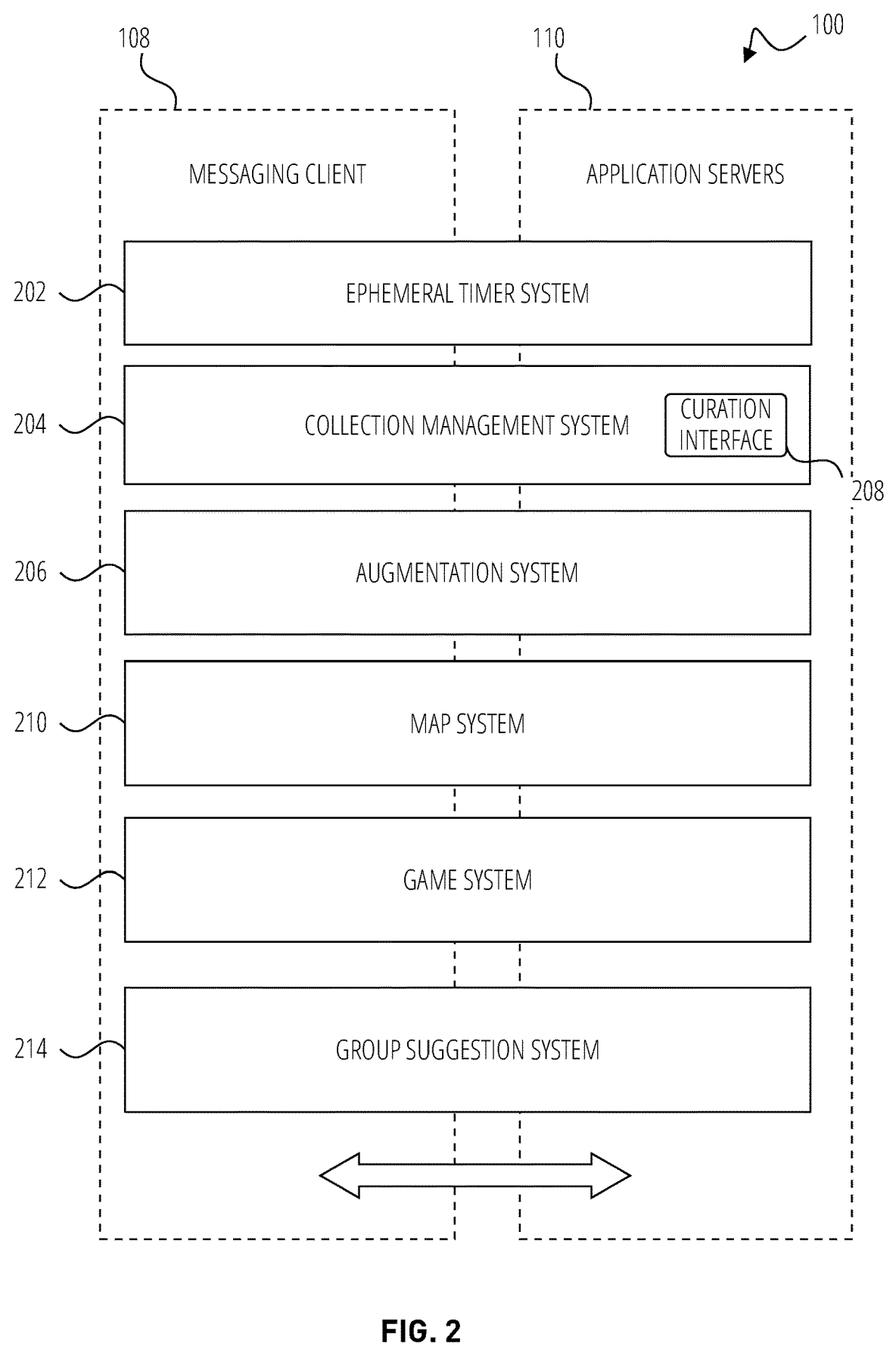

108

110

100

MESSAGING CLIENT

APPLICATION SERVERS

202 — EPHEMERAL TIMER SYSTEM

204 — COLLECTION MANAGEMENT SYSTEM | CURATION INTERFACE

208

206 — AUGMENTATION SYSTEM

210 — MAP SYSTEM

212 — GAME SYSTEM

214 — GROUP SUGGESTION SYSTEM

FIG. 2

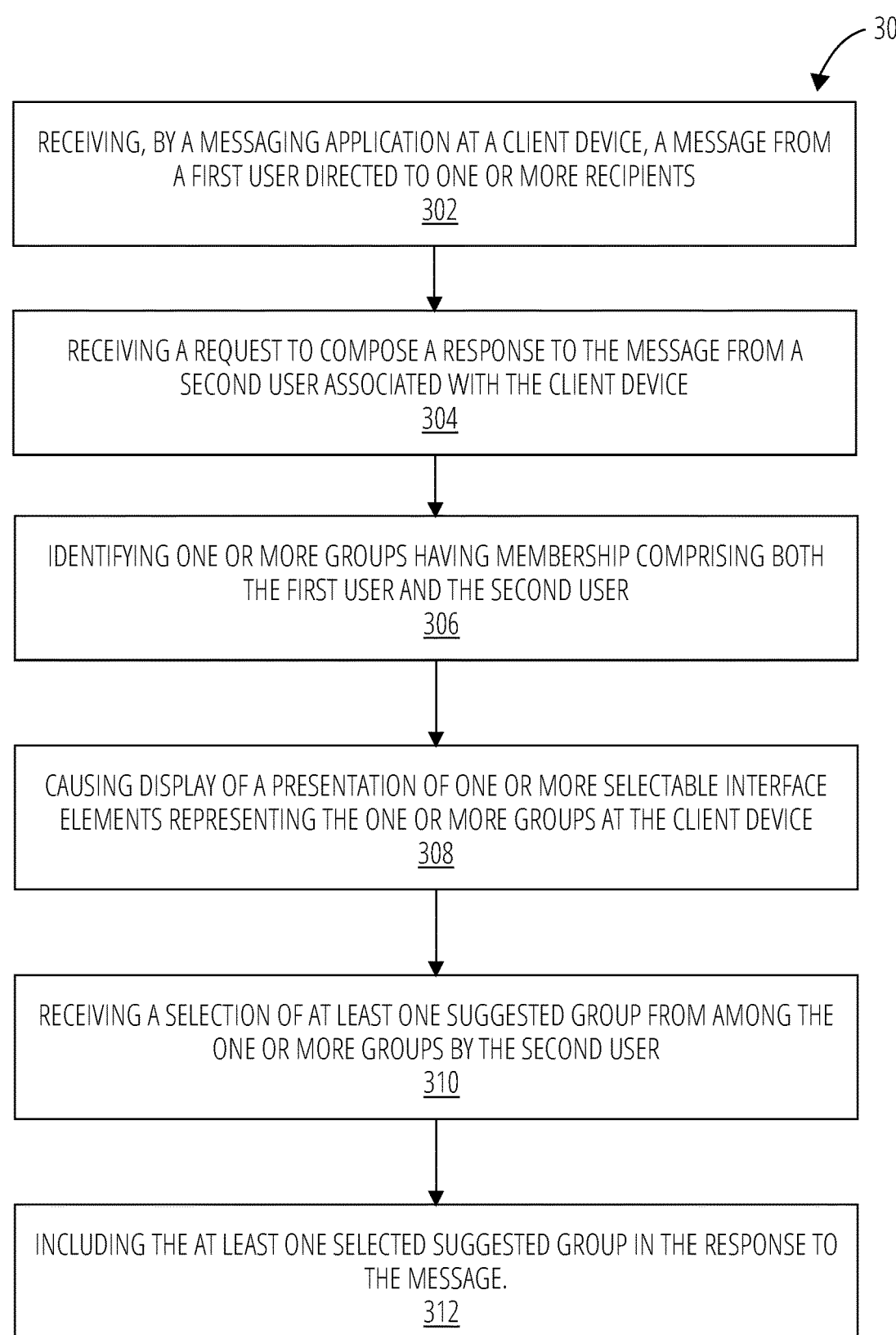

RECEIVING, BY A MESSAGING APPLICATION AT A CLIENT DEVICE, A MESSAGE FROM A FIRST USER DIRECTED TO ONE OR MORE RECIPIENTS
302

RECEIVING A REQUEST TO COMPOSE A RESPONSE TO THE MESSAGE FROM A SECOND USER ASSOCIATED WITH THE CLIENT DEVICE
304

IDENTIFYING ONE OR MORE GROUPS HAVING MEMBERSHIP COMPRISING BOTH THE FIRST USER AND THE SECOND USER
306

CAUSING DISPLAY OF A PRESENTATION OF ONE OR MORE SELECTABLE INTERFACE ELEMENTS REPRESENTING THE ONE OR MORE GROUPS AT THE CLIENT DEVICE
308

RECEIVING A SELECTION OF AT LEAST ONE SUGGESTED GROUP FROM AMONG THE ONE OR MORE GROUPS BY THE SECOND USER
310

INCLUDING THE AT LEAST ONE SELECTED SUGGESTED GROUP IN THE RESPONSE TO THE MESSAGE.
312

MENTIONED

508

506

510

512

514

SUGGESTING RELEVANT GROUPS AND INDIVIDUALS IN MESSAGE REPLIES

BACKGROUND

Electronic messaging platforms have become common communication tools, with services like email, texting, and social media used daily by billions of users. Group messaging involving multiple recipients is a frequent need for users. However, existing messaging applications require the sender to manually select every intended recipient when composing a message.

For group messages, this can be time consuming as the sender must remember each relevant contact and select them individually. The burden of recalling and choosing recipients reduces the efficiency of group messaging interactions. Some messaging platforms suggest contacts based only on entered characters rather than context.

Therefore, there is a need for improvements to the group messaging experience to make selecting recipients faster and easier. Specifically, messaging applications that can understand context and suggest relevant potential recipients could provide a better user experience. More efficient group messaging and recipient selection could lead to increased engagement with group messaging features.

While current solutions rely solely on manual recipient selection by the sender, opportunities exist to explore alternative approaches to suggesting potential message recipients. Intelligent and contextual suggestions could significantly improve group messaging workflows.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 2 is a diagrammatic representation of a messaging system, in accordance with some examples, that has both client-side and server-side functionality.

FIG. 3 is a flowchart depicting a method for suggesting one or more user groups to include in a response to a message, in accordance with one embodiment.

DETAILED DESCRIPTION

Figure 1:
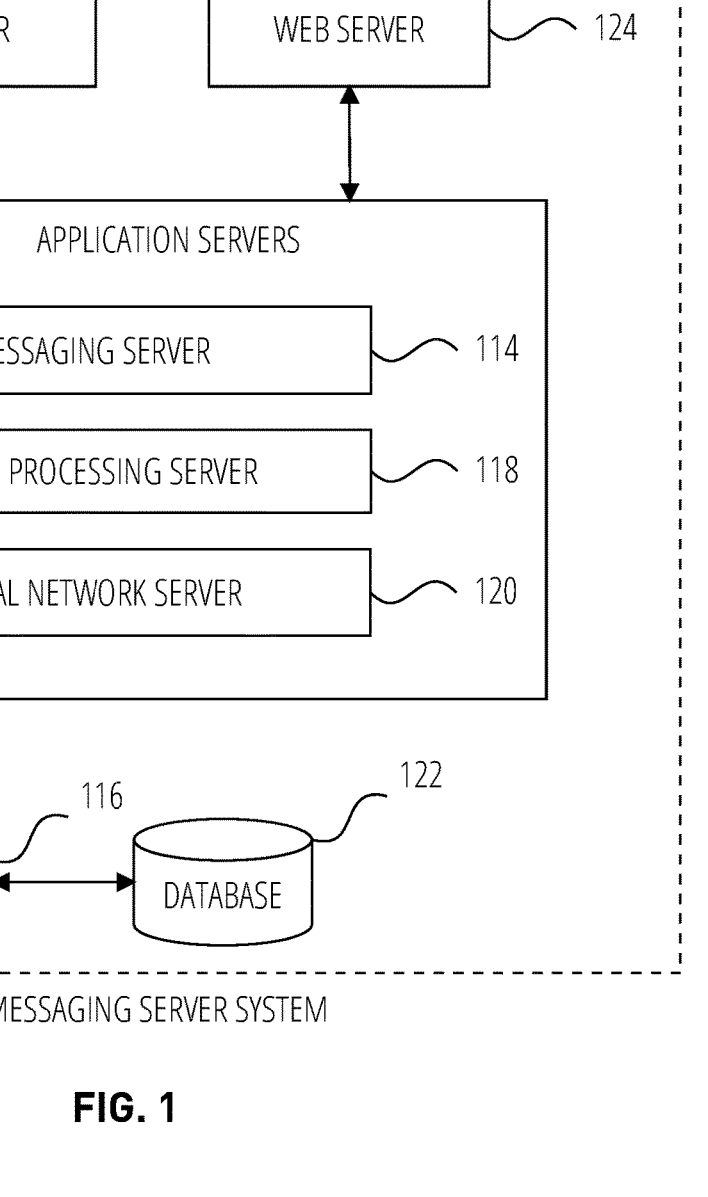
FIG. 1 is a diagrammatic representation of a networked environment in which the present disclosure may be deployed, in accordance with some examples.

Electronic messaging platforms enable users to easily communicate with each other. Group messaging, or sending messages to multiple people, is very common. However, picking who to send group messages to can be annoying and time-consuming. Users have to manually select each person they want to message every time.

The techniques described here make group messaging much faster and easier. When a user replies to a message, the system automatically suggests relevant groups and people to message based on context. For example, if both the sender and replier belong to a Group A, the suggestion provided may include Group A. Or if the message is about topic Z, groups related to topic Z may be recommended.

The user can simply review the suggestions and tap to add relevant groups and contacts. This saves the effort of remembering and selecting each recipient manually. Personalized, intelligent suggestions make group messaging seamless. Users can respond to conversations faster with less effort.

A computer-implemented method for suggesting relevant recipients when a user replies to a received message comprises the following steps. A messaging application installed on a user's client device receives a first message from a first user account directed to one or more recipient users. When a second user account associated with the client device requests to compose a reply message responsive to the received first message, the messaging application detects this reply message composition.

The messaging application then identifies one or more groups having membership comprising both the first user who sent the original message, as well as the second user who is authoring the reply message. These groups represent connections and relationships shared between the two users. The application can identify these mutual groups by analyzing group membership data associated with the users' accounts on the messaging platform.

To identify the relevant groups with mutual membership, the messaging application can search and analyze groups associated with the second user's account and profile. Many messaging platforms enable users to create and participate in multiple groups reflecting social circles, topics, chats, and more. The messaging application analyzes this plurality of groups in the second user's account to find those containing both the first and second users. In certain embodiments, advanced matching algorithms and optimization techniques like heuristics and caching can be employed to efficiently identify mutual groups as user accounts participate in increasing numbers of groups over time.

When composing the reply message, the second user is presented with selectable interface elements representing the identified one or more mutual groups. These elements may be displayed as part of the recipient selection interface while the second user is typing the reply message. The selectable elements enable convenient addition of the suggested groups as recipients of the reply message. The second user can simply tap on the displayed representation of a group to select it. Visual design factors like color, placement, and prominence can be used to highlight suggested groups to users. Interactivity can be optimized to minimize gestures and taps needed to add a group.

In some embodiments, the messaging application determines an order or ranking for the identified groups before display. This allows presenting the most relevant suggestions first based on the context. The order can be determined based on factors such as recent or frequent interaction with the groups by the second user, number of connections between the two users in each group, and analysis of the content of the received message.

Advanced machine learning algorithms like neural networks can be implemented to train predictive models on historical messaging data. These models can accurately rank suggested groups personalized to each user's unique communication patterns and relationships.

For instance, identified groups can be ranked based on the recency or frequency of interactions like sending/receiving messages and content. Groups interacted with more recently or frequently may be deemed more relevant to suggest. The number of mutual connections between the first and second user within each group can also be used to infer relevance and priority. Further, the content of the received message can be analyzed using natural language processing techniques to determine topics and keywords. Identified groups can then be ranked based on similarity to these message topics and keywords.

Topic modeling, sentiment analysis, named entity recognition, and other NLP techniques can extract meaning from messaging content to match groups. Useful metadata like timestamps, geo-location, and platform events can also inform ranking predictions.

In some implementations, individual member accounts within that group can also be suggested. These member accounts represent contacts relevant to the conversation who the second user may wish to include alongside the group. Displaying individuals alongside groups provides additional context and surfaces more potential recipients tailored to the reply scenario.

Advanced segmentation and filtering techniques can be applied to identify the most relevant subset of group members to suggest based on past interactions, interests, and other attributes.

The selectable interface elements representing the suggested groups may display useful identifying information. Elements can display a name, avatar, description, or other identifier for the group. The number of member accounts in the group can also be displayed to provide additional context when selecting suggested groups.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a Group Suggestion System 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The group suggestion system 214 enables intelligent suggesting of relevant groups when a user is replying to a received message in a messaging application. When the system detects a user is composing a reply to a message, it identifies one or more groups that have membership comprising both the original sending user as well as the replying user. According to certain example embodiments, to identify these relevant mutual groups, the system analyzes group membership data associated with the users' accounts on the messaging platform. Advanced algorithms can efficiently match groups across the plurality of groups associated with the replying user's account.

Once relevant groups have been identified, the system causes selectable interface elements representing these groups to be displayed to the replying user composing the response message. The system may determine a ranking or order for the groups based on factors such as recent/frequent interactions and number of mutual connections. The selectable elements allow the replying user to conveniently add suggested groups as recipients to the reply message. When a group is selected, the system includes the group as a recipient of the reply message.

In some embodiments, when a group is selected, the system also suggests individual member accounts from that group who may be relevant to include in the reply. Sophisticated segmentation techniques can identify the most relevant subset of members to display.

FIG. 3 is a flowchart illustrating operations of a group suggestion system 214 in performing a method 300 for suggesting one or more user groups to include in a response to a message, in accordance with one embodiment. Operations of the method 300 may be performed by one or more subsystems of the messaging system 100 described above with respect to FIG. 2, such as the group suggestion system 214. As shown in FIG. 3, the method 300 includes one or more operations 302, 304, 306, 308, 310, and 312.

At operation 302, a messaging application executing on a client device receives a message from a first user directed to one or more recipients. The message may comprise media content such as an image, video, or audio.

At operation 304, the group suggestion system 214 receives a request to compose a response to the received message from a second user associated with the client device. This request can be initiated by the second user selecting a reply button or inputting text to respond to the message. The group suggestion system 214 may determine suggested recipients for the response message based on factors like the content of the original message, the text of the response being composed, and recent messaging activity of the second user. Message content analysis could employ natural language processing or machine learning to extract keywords, topics, and other relevant information from the received message, or in some embodiments from contents of the response to the received message composed by the second user associated with the client device.

At operation 306, the group suggestion system 214 identifies one or more groups from among a plurality of groups associated with the second user of the client device that have membership comprising both the first sending user and the second replying user. According to certain embodiments, "groups" may refer to collections of user accounts that have a shared membership or association on a messaging platform. For example groups may represent: formal organizations or clubs with defined memberships; friend groups created by users to message specific sets of friends; chat groups with defined members for group messaging; social media groups that users join related to interests or affiliations; professional networking groups for colleagues in similar industries; or any collection of user accounts that have a common association based on factors that include user attributes and affinities and ability to message as a group. Accordingly, a "group" consists of multiple member user accounts on a messaging platform, and that messages can be sent to the group such that they are received by all members belonging to that group.

Various techniques can be used to identify these mutual groups with shared membership. In one embodiment, the system queries account group membership data to efficiently lookup groups associated with both users. Advanced algorithms can match groups across the plurality associated with each user account.

At operation 308, the messaging application causes selectable interface elements representing the identified mutual groups to be displayed to the second user at the client device. These selectable elements allow convenient selection of suggested groups to add to the reply. In some embodiments, the groups are ranked and ordered based on relevance factors like recent/frequent interactions between one or more of the first user, the second user and the group, recency of interactions between one or more of the first user, the second user and the group, and number of mutual connections between the one or more groups and the first user and second user. The selectable interface elements may comprise an identifier associated with the group, as well as one or more identifiers associated with mutual group members shared between the first user and second user, as well as a group member count.

At operation 310, the system receives selection of at least one suggested group by the second user from among the displayed groups. The user can select a group to include as a recipient of the reply message. The interface may allow horizontal scrolling to view additional groups beyond the initial visible portion. In some embodiments, the second user may provide an input to hover over a group to preview its members before selecting. Partial input of a group name could also trigger auto-complete.

In certain embodiments, the group suggestion system 214 may enable the second user to create a new group using suggested groups and individual users. For example, after the second user selects one or more suggested groups or individuals at operation 310, the group suggestion system 214 may present an option to "Create New Group" based on the selections. When the user chooses this option, they could be prompted to provide a name for the new group. The group suggestion system 214 may then generate a new group comprising the members of the selected suggested groups as well as any other specified recipients. Additional users could also be added to the new group manually by the second user.

Interface elements like contact list pickers could facilitate finding and adding individual user accounts. Once finalized, this new user group would be saved in the second user's account on the messaging platform, and may appear as a suggested group in future conversations where its member set is relevant.

At operation 312, the messaging application includes the at least one selected group in the composed reply message as a recipient. When the user ultimately sends the reply message, it will be directed to the selected group(s) in addition to any other specified recipients. In certain embodiments, when a group is selected, individual member accounts from that group are also suggested based on relevance.

In some embodiments, visual indicators may show the groups included and the number of recipients. Selected groups could be highlighted, tagged, or annotated for clarity. A send confirmation screens may summarize the total recipients. Analytics may track group suggestion usage.

Figure 4:
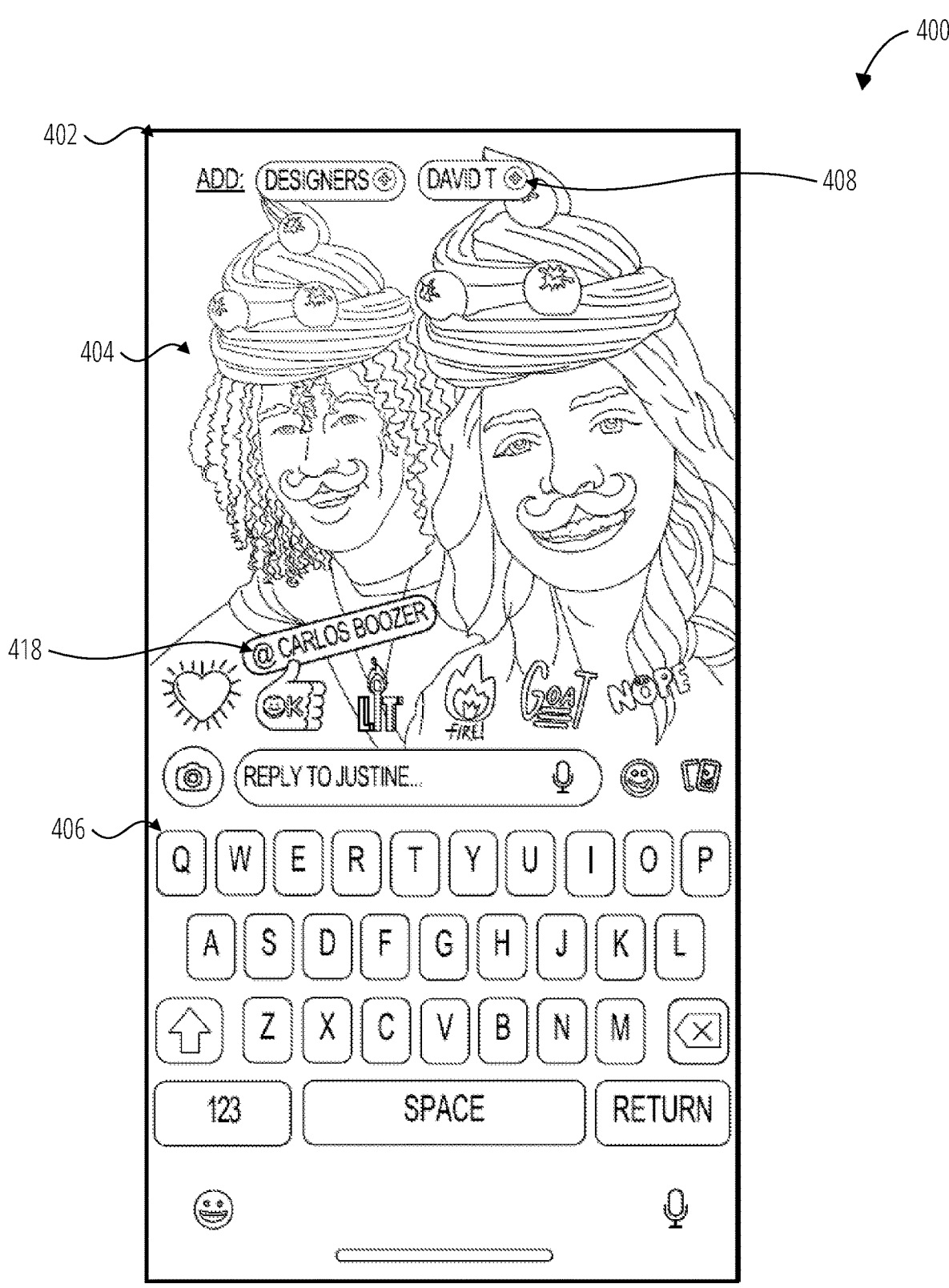
FIG. 4 is an interface diagram depicting an interface presented by a group suggestion system, in accordance with one embodiment.

FIG. 4 is an interface diagram 400 depicting an interface presented by a group suggestion system 214, in accordance with one embodiment. As seen in the interface diagram 400, an interface 402 includes a display of message content 404, wherein the message content 404 comprises image features, as well as a user tag 418 that includes an identification of one or more user accounts. The interface diagram 400 also depicts a message composition menu 406, and a display of a presentation of suggestions 408, wherein the suggestions 408 include one or more user or group identifiers.

In response to displaying the message content 404, the group suggestion system 214 may present a message composition menu 406 allowing the receiving user (i.e., the second user) to compose a reply. This corresponds to the operation 304 of receiving a reply request.

The composition menu 406 may contain options to add text, media, attachments, and other content to the reply message. Input methods could include typing, voice, and gestures. The interface may also allow selecting additional individual recipients.

Based on the sender, tagged users, and message content, the system identifies mutual groups shared between the sending and replying users as in operation 306. Advanced algorithms, heuristics, and machine learning techniques could be employed to determine the most relevant groups to suggest based on past interactions, interests, relationships, and other factors.

A presentation of suggestions 408 is displayed representing these identified mutual groups. The suggestions correspond to selectable interface elements described in operation 308. Visual formats could include horizontal scrolling lists, vertically stacked cards, drop-down menus, or radial dials.

In some embodiments, the presentation 408 may display additional suggested individual recipients along with the groups based on relevance. The suggestions may be ranked and ordered based on factors like recent interactions, number of mutual connections, interests, past messaging, etc. The user can select one or more of the suggested groups and individuals, as in operation 310, which will then be included in the reply message composition. Input modalities could involve tapping, clicking, keyboard shortcuts, voice commands, or drag-and-drop gestures.

Figure 5:
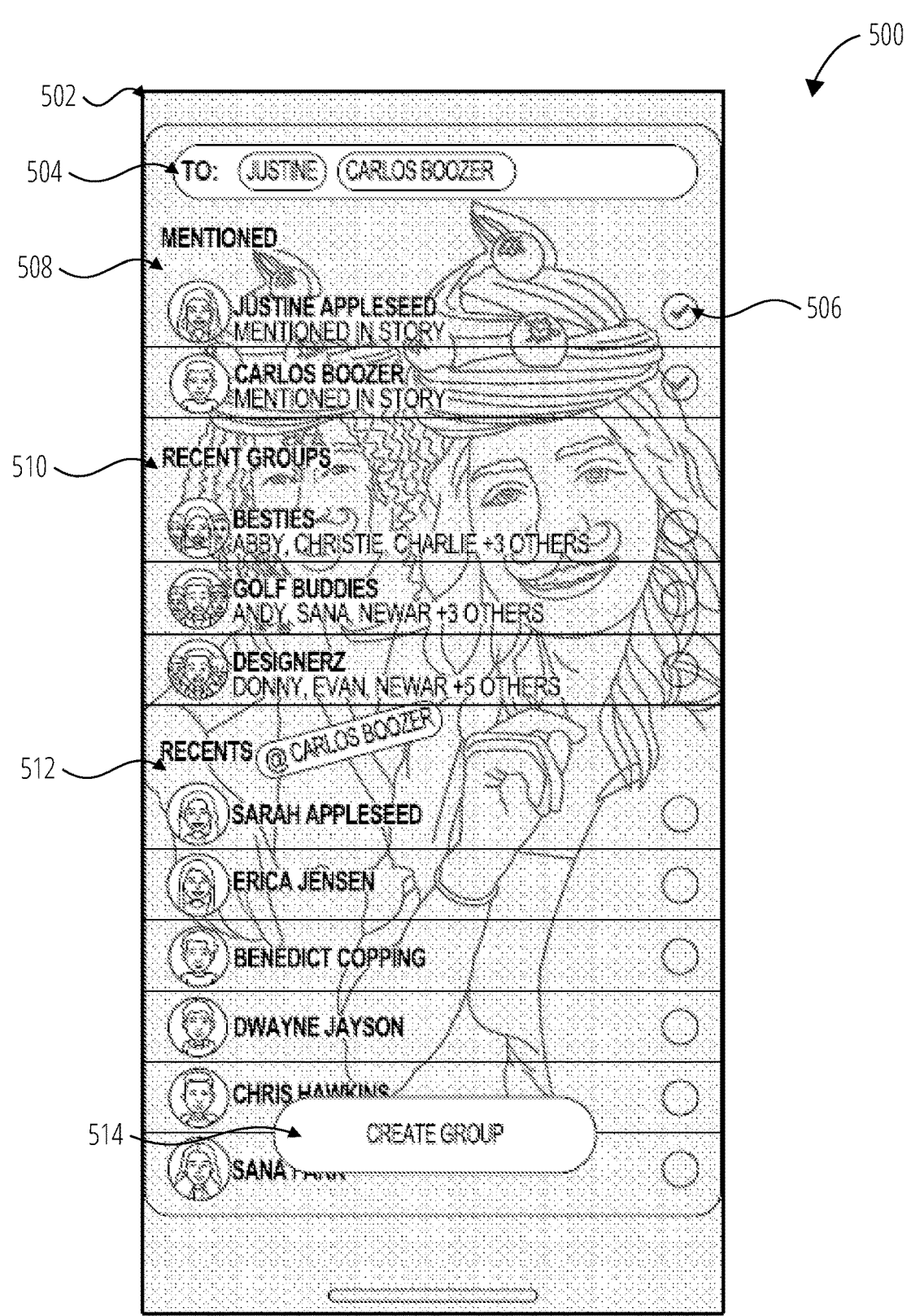
FIG. 5 is an interface diagram depicting an interface displayed by a group suggestion system, in accordance with one embodiment.

FIG. 5 is an interface diagram 500 depicting an interface presented by a group suggestion system 214, in accordance with one embodiment. As seen in the interface diagram 500, an interface 502 may include a plurality of menu elements to display user identifiers associated with contacts of a user within a messaging application. The interface 502 allows a user (i.e., a second user) to select suggested groups and individual recipients when composing a reply message.

The interface includes an address line 504 displaying the identifiers of any currently selected users and groups to receive the reply message. For example, the address line 504 may include a text input field to display one or more user or group identifiers selected by a user of the client device 106.

Proximate to the address line 504 are one or more display regions presenting different types of suggested recipients. Display region 508 (i.e., "MENTIONED") shows users mentioned or tagged in the received message (i.e., the user tag 418 of the message content 404 depicted in FIG. 4).

Display region 510 (i.e., "RECENT GROUPS") displays mutual groups that contain both the replying user and the user who sent the original received message which the replying user and user who sent the original message recently sent or received messages from. These mutual groups are identified by the system as relevant suggestions.

Display region 512 (i.e., "RECENTS") shows individual recent connections that the replying user has corresponded with. In some embodiments specifically those with mutual connections to the original sender.

The groups and individual users may be ranked and ordered within their display regions 508, 510, 512 based on factors like recency, frequency, and number of mutual connections.

When the user selects suggested user identifiers 506 and groups, the group suggestion system 214 displays the selected identifiers within the address line 504, and in some embodiments may display a selection indicator proximate to the selected identifiers within the relevant display region (i.e., a check mark).

The interface 502 also includes a "Create Group" icon 514. Selecting this allows the user to generate a new group using suggested members which can then appear as a suggestion in future conversations.

Machine Architecture

Figure 6:
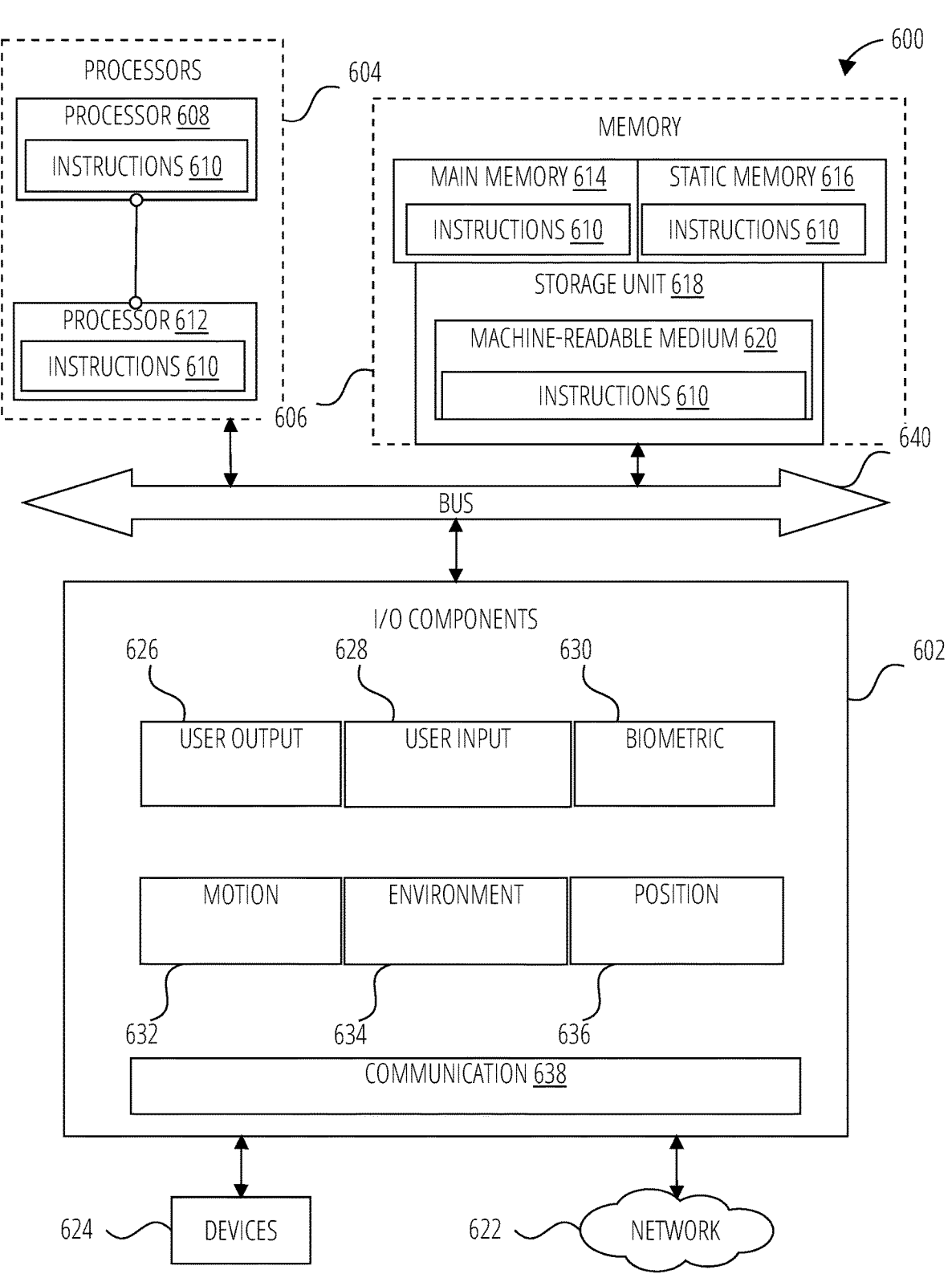
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 106 or any one of a number of server devices forming part of the messaging server system 104. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 638, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
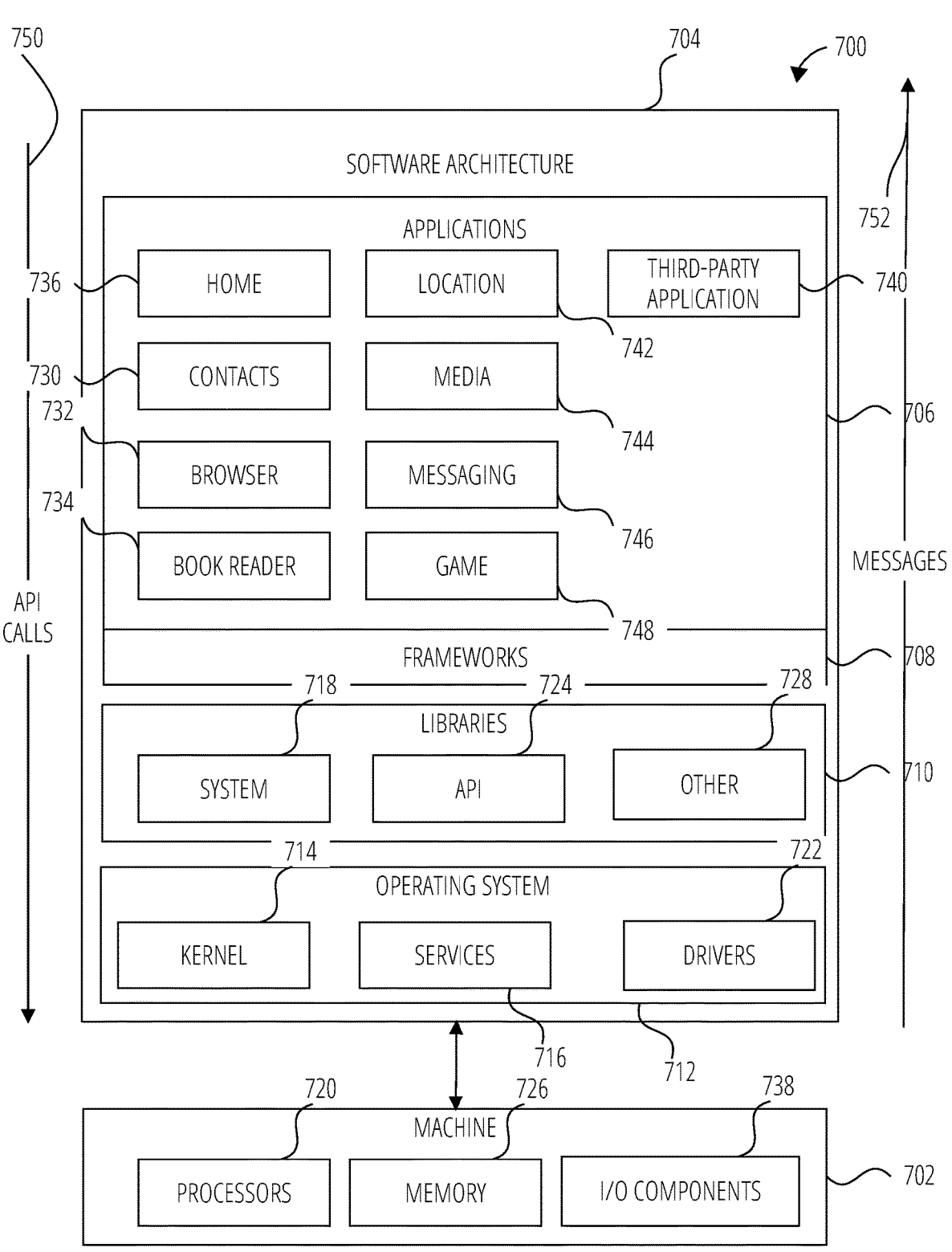
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Processing Components

Figure 8:
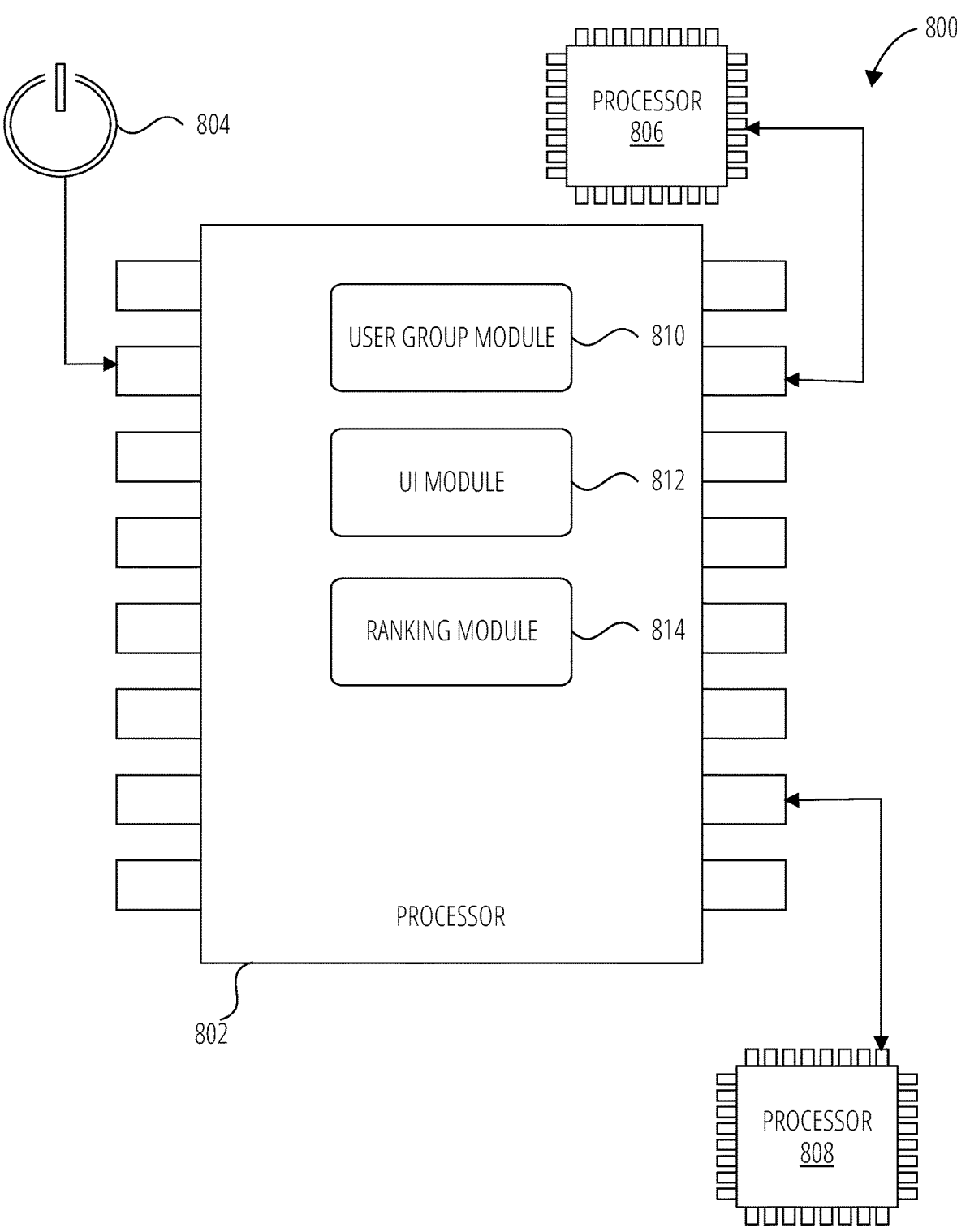
FIG. 8 is a diagrammatic representation of a processing environment, in accordance with some examples.

Turning now to FIG. 8, there is shown a diagrammatic representation of a processing environment 800, which includes a processor 802, a processor 806, and a processor 808 (e.g., a GPU, CPU or combination thereof).

The processor 802 is shown to be coupled to a power source 804, and to include (either permanently configured or temporarily instantiated) modules, namely a user group module 810, a UI module 712, and a ranking module 814, operationally configured to perform operations as discussed in the method 300 of FIG. 3, and the interface flow diagram 400 of FIG. 4, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving, by a messaging application at a client device, a message from a first user directed to one or more recipients;
   receiving a request to compose a response to the message from a second user associated with the client device;
   determining a topic associated with the message based on the request to compose the response to the message;
   identifying one or more groups based on the topic associated with the message;
   causing display of a presentation of one or more selectable interface elements representing the one or more groups identified based on the topic at the client device;
   receiving a selection of at least one suggested group from among the one or more groups by the second user; and
   including the at least one selected suggested group in the response to the message.

2. The method of claim 1, wherein the identifying the one or more groups further comprises identifying the one or more groups based on:
   the response to the message; and
   recent messaging activity of the second user.

3. The method of claim 2, wherein the content of the message includes one or more user identifiers.

4. The method of claim 1, wherein the causing display of the presentation of the one or more selectable interface elements includes:
   determining a ranking of each of the one or more groups; and
   causing display of the presentation of the one or more selectable interface elements based on the ranking.

5. The method of claim 1, wherein the ranking of each of the one or more groups is based on one or more of:
   a frequency of interaction associated with each of the one or more groups;
   a recency of interaction associated with each of the one or more groups; and
   a number of mutual connections between the first user, the second user, and users among each of the one or more groups.

6. The method of claim 1, wherein the one or more selectable interface elements representing the one or more groups comprise an identifier and a group member count.

7. The method of claim 1, wherein the causing display of the presentation of the one or more selectable interface elements includes:

presenting the one or more interface elements in a horizontal arrangement that enables scrolling to view additional interface elements beyond an initial visible portion of the one or more interface elements.

8. A system comprising:

one or more processors; and a memory comprising instructions which, when executed by the one or more processors, cause the one or more processors to perform operations comprising:

receiving, by a messaging application at a client device, a message from a first user directed to one or more recipients;

receiving a request to compose a response to the message from a second user associated with the client device;

determining a topic associated with the message based on the request to compose the response to the message;

identifying one or more groups based on the topic associated with the message;

causing display of a presentation of one or more selectable interface elements representing the one or more groups identified based on the topic at the client device;

receiving a selection of at least one suggested group from among the one or more groups by the second user; and including the at least one selected suggested group in the response to the message.

9. The system of claim 8, wherein the identifying the one or more groups further comprises identifying the one or more groups based on:

the response to the message; and recent messaging activity of the second user.

10. The system of claim 9, wherein the content of the message includes one or more user identifiers.

11. The system of claim 8, wherein the causing display of the presentation of the one or more selectable interface elements includes:

determining a ranking of each of the one or more groups; and causing display of the presentation of the one or more selectable interface elements based on the ranking.

12. The system of claim 8, wherein the ranking of each of the one or more groups is based on one or more of:

a frequency of interaction associated with each of the one or more groups;

a recency of interaction associated with each of the one or more groups; and a number of mutual connections between the first user, the second user, and users among each of the one or more groups.

13. The system of claim 8, wherein the one or more selectable interface elements representing the one or more groups comprise an identifier and a group member count.

14. The wherein the object of claim 8, wherein the message comprises media content.

15. A non-transitory machine-readable storage medium comprising instructions that, when executed by one or more processors of a machine, cause the machine to perform operations comprising:

receiving, by a messaging application at a client device, a message from a first user directed to one or more recipients;

receiving a request to compose a response to the message from a second user associated with the client device;

determining a topic associated with the message based on the request to compose the response to the message;

identifying one or more groups based on the topic associated with the message;

causing display of a presentation of one or more selectable interface elements representing the one or more groups identified based on the topic at the client device;

receiving a selection of at least one suggested group from among the one or more groups by the second user; and including the at least one selected suggested group in the response to the message.

16. The non-transitory machine-readable storage medium of claim 15, wherein the identifying the one or more groups further comprises identifying the one or more groups based on:

the response to the message; and recent messaging activity of the second user.

17. The non-transitory machine-readable storage medium of claim 16, wherein the content of the message includes one or more user identifiers.

18. The non-transitory machine-readable storage medium of claim 15, wherein the causing display of the presentation of the one or more selectable interface elements includes:

determining a ranking of each of the one or more groups; and causing display of the presentation of the one or more selectable interface elements based on the ranking.

19. The non-transitory machine-readable storage medium of claim 15, wherein the ranking of each of the one or more groups is based on one or more of:

a frequency of interaction associated with each of the one or more groups;

a recency of interaction associated with each of the one or more groups; and a number of mutual connections between the first user, the second user, and users among each of the one or more groups.

20. The non-transitory machine-readable storage medium of claim 15, wherein the one or more selectable interface elements representing the one or more groups comprise an identifier and a group member count.

\* \* \* \* \*